US012149795B2

(12) United States Patent
Lin

(10) Patent No.: US 12,149,795 B2
(45) Date of Patent: Nov. 19, 2024

(54) METHOD AND APPARATUS FOR PRESENTING AUDIOVISUAL WORK, DEVICE, AND MEDIUM

(71) Applicant: Tencent Technology (Shenzhen) Company Limited, Shenzhen (CN)

(72) Inventor: Jiexian Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/981,899

(22) Filed: Nov. 7, 2022

(65) Prior Publication Data

US 2023/0054388 A1 Feb. 23, 2023

Related U.S. Application Data

(63) Continuation of application No. PCT/CN2022/076478, filed on Feb. 16, 2022.

(30) Foreign Application Priority Data

Feb. 25, 2021 (CN) .......................... 202110214407.4

(51) Int. Cl.
*H04N 21/472* (2011.01)
*G11B 27/00* (2006.01)
*G11B 27/34* (2006.01)

(52) U.S. Cl.
CPC ..... *H04N 21/47217* (2013.01); *G11B 27/005* (2013.01); *G11B 27/34* (2013.01)

(58) Field of Classification Search
CPC . H04N 21/47217; G11B 27/005; G11B 27/34
See application file for complete search history.

(56) References Cited

U.S. PATENT DOCUMENTS 9,179,192 B1 * 11/2015 Ning .................. G06F 3/0482
2007/0294622 A1 * 12/2007 Sterner ................ G11B 27/105
715/716

(Continued)

FOREIGN PATENT DOCUMENTS

CN 103197857 A 7/2013
CN 109794064 A 5/2019

(Continued)

OTHER PUBLICATIONS

International Search Report and Written Opinion with English Translation for International Patent Application No. PCT/CN2022/076478 dated Apr. 28, 2022, 12 pages.

(Continued)

Primary Examiner — Sherrod L Keaton
(74) Attorney, Agent, or Firm — Crowell & Moring LLP

(57) ABSTRACT

This application provides a method and apparatus for presenting an audiovisual work, a device, and a medium, and belongs to the field of artificial intelligence. The method includes: displaying a map control of the audiovisual work, the map control displaying a map associated with a plot of the audiovisual work; determining a marker point on the map in response to a location marking operation on the map; and presenting a plot clip in the audiovisual work that corresponds to the marker point.

18 Claims, 10 Drawing Sheets

(56) References Cited

U.S. PATENT DOCUMENTS

| | | | |
|---|---|---|---|
| 2011/0283322 A1* | 11/2011 | Hamano | H04N 21/47 725/44 |
| 2013/0024891 A1* | 1/2013 | Elend | H04N 21/8456 725/35 |
| 2014/0298269 A1 | 10/2014 | Underkoffler et al. | |
| 2015/0281902 A1* | 10/2015 | Lehtiniemi | H04W 4/024 455/456.3 |
| 2016/0006979 A1* | 1/2016 | Gilboa-Solomon | G11B 27/005 386/248 |
| 2016/0103830 A1* | 4/2016 | Cheong | G06F 16/745 715/738 |
| 2020/0041301 A1* | 2/2020 | Jalasutram | H04W 4/029 |

FOREIGN PATENT DOCUMENTS

| | | |
|---|---|---|
| CN | 109982142 A | 7/2019 |
| CN | 111314784 A | 6/2020 |
| CN | 111654730 A | 9/2020 |
| CN | 111818371 A | 10/2020 |

OTHER PUBLICATIONS

Office Action with English Translation of Concise Explanation of Relevance for Chinese Patent Application No. 202110214407.4 dated Jun. 6, 2023, 10 pages.

* cited by examiner

METHOD AND APPARATUS FOR PRESENTING AUDIOVISUAL WORK, DEVICE, AND MEDIUM

RELATED APPLICATION

This application is a continuation application of PCT Patent Application No. PCT/CN2022/076478, filed on Feb. 16, 2022, which claims priority to Chinese Patent Application No. 202110214407.4, filed with the China National Intellectual Property Administration, PRC on Feb. 25, 2021, which is incorporated herein by reference in its entirety.

FIELD OF THE TECHNOLOGY

Embodiments of this disclosure relate to the field of artificial intelligence, and in particular, to a method and apparatus for presenting an audiovisual work, a device, and a medium.

BACKGROUND OF THE DISCLOSURE

Audiovisual works such as TV series, novels, and comics are the most widely used multimedia content on the Internet.

In the related art, an audiovisual work is organized in a form of episode, chapter, section, or the like. For example, a TV series has many episodes, a novel has many chapters, and a comic has many sections. Take watching a TV series as an example, a user may watch the TV series from front to back with episode as a unit. In an episode of the TV series, the user may drag a playback progress bar to trigger a player to display a small plot window on a playback screen. According to the plot displayed on the small plot window, the user jumps to a specified plot for watching.

For some audiovisual works with complex plots, such as a TV series shot in reverse order or a variety show requiring reasoning, it is relatively difficult to understand the audiovisual work when watching using the foregoing method, and it is necessary to return to a specific scene to watch repeatedly. However, the human-machine interaction efficiency of searching for the specific scene by dragging the playback progress bar is relatively low.

SUMMARY

This application provides a method and apparatus for presenting an audiovisual work, a device, and a medium, which enables switching between different plot clips based on a map marker point on a map for presentation. The technical solutions are as follows:

According to an aspect of this application, a method for presenting an audiovisual work is provided, including:

displaying a map control of the audiovisual work, a map associated with a plot of the audiovisual work being displayed on the map control;

determining a map marker point on the map in response to a location marking operation on the map; and presenting a plot clip in the audiovisual work that corresponds to the map marker point.

According to another aspect of this application, an apparatus for presenting an audiovisual work is provided, including:

a display module, configured to display a map control of the audiovisual work, a map associated with a plot of the audiovisual work being displayed on the map control;

an interaction module, configured to determine a map marker point on the map in response to a location marking operation on the map; and a presentation module, configured to present a plot clip in the audiovisual work that corresponds to the map marker point.

According to another aspect of this application, a computer device is provided, including: a processor and a memory, the memory storing a computer program, and the computer program being loaded and executed by the processor to implement the foregoing method for presenting an audiovisual work.

According to another aspect of this application, a non-transitory computer-readable storage medium is provided, storing a computer program, the computer program being loaded and executed by a processor to implement the foregoing method for presenting an audiovisual work.

According to another aspect of this application, a computer program product is provided, including computer instructions, the computer instructions being stored in a non-transitory computer-readable storage medium. A processor of a computer device reads the computer instructions from the non-transitory computer-readable storage medium, and executes the computer instructions to cause the computer device to perform the method for presenting an audiovisual work provided by the foregoing aspects.

By displaying a map associated with a plot of an audiovisual work, and presenting, in response to a map marker point selected by the user on the map, a plot clip in the audiovisual work that corresponds to the map marker point, a map-based jumping presentation solution can be provided. In this way, the user can switch between different plot clips based on the map marker point on the map for presentation, and a more efficient human-machine interaction solution is provided for audiovisual works in a type of inverted shooting, random shooting, decrypted subject, long giant production, and the like.

DESCRIPTION OF EMBODIMENTS

Figure 1:
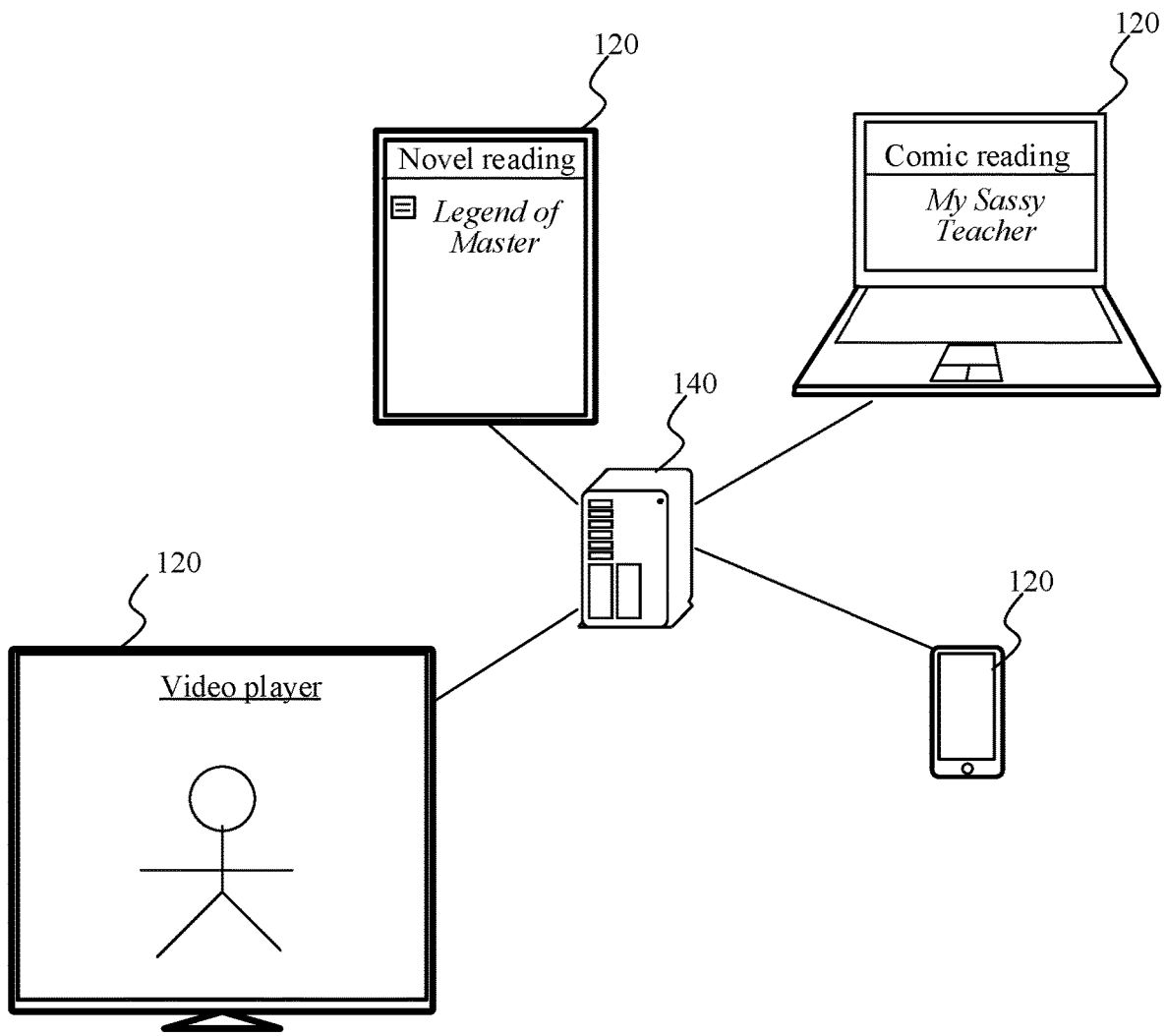
FIG. 1 is a structural block diagram of an example computer system according to an exemplary embodiment.

FIG. 1 is a structural block diagram of a computer system according to an exemplary embodiment of this application. The computer system 100 includes: a terminal device 120 and a server 140.

The terminal 120 installs and runs a client configured to present an audiovisual work, and the client may be an application program or a web client. For example, the client is an application program. The application program may be any one of a video playing program, a novel reading program, a comic reading program, and an audio playing program. In this embodiment, descriptions are made using an example in which the application program is a video playing program.

The terminal 120 may include, but is not limited to, a mobile terminal such as a smartphone, a tablet computer, a portable laptop computer, or an in-vehicle terminal, or may be a terminal such as a desktop computer or a projection computer, which is not limited in this embodiment of this application.

The terminal 120 is connected to the server 140 by using a wireless network or a wired network.

The server 140 includes at least one of one server, a plurality of servers, a cloud computing platform, and a virtualization center. The server 140 is configured to provide a background service for the client. Optionally, the server 140 is responsible for primary computing work, and the terminal 120 is responsible for secondary computing work; or the server 140 is responsible for secondary computing work, and the terminal 120 is responsible for primary computing work; or the server 140 and the terminal 120 perform collaborative computing by using a distributed computing architecture.

A method for presenting an audiovisual work provided by the embodiments of this application is described with reference to the foregoing implementation environment description. Descriptions are made by using an example in which an executing entity of the method is a computer device.

Figure 2:
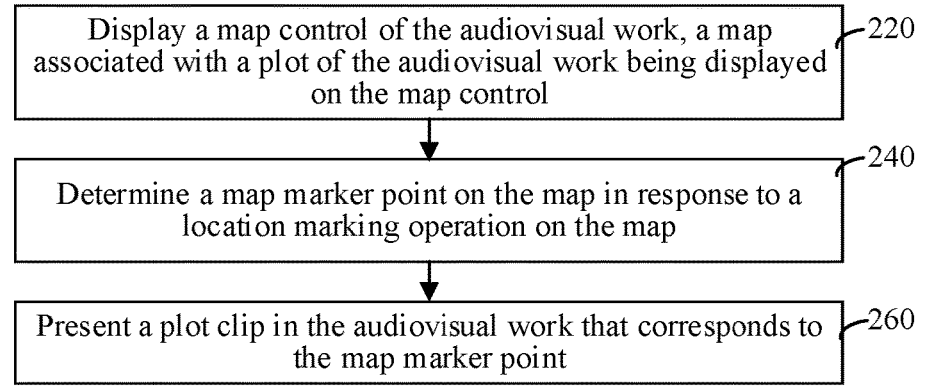
FIG. 2 is a flowchart of a method for presenting an audiovisual work according to an exemplary embodiment.

FIG. 2 is a flowchart of a method for presenting an audiovisual work according to an exemplary embodiment of this application. The method includes:

Step 220: Display a map control of the audiovisual work, a map associated with a plot of the audiovisual work being displayed on the map control.

The audiovisual work is a work with a plot. A presentation manner of the audiovisual work includes at least one of visual display and audio playback.

The audiovisual work includes: at least one of a video, an audio, a literary work, and a comic. For example, the audiovisual work is a movie, a TV series, a documentary, a novel, a biography, an audiobook, a cartoon, or the like.

The map of the audiovisual work is related to the plot. For example, the map is a map in which characters in the audiovisual work are active, or is a map involved in a world view constructed in the audiovisual work.

Exemplarily, the map may be a two-dimensional map or a three-dimensional map.

The map may be a natural map, a social map, a humanistic map, an economic map, a historical map, a cultural map, a traffic map, an aeronautical map, an astronautical map, a nautical map, a tourist map, or the like, which is not limited in this application.

In an embodiment, the computer device displays a map control of the audiovisual work before starting to present the audiovisual work; or the computer device displays the map control of the audiovisual work during the presentation of an audiovisual work.

The map control is a full-screen control, a window control, or an element control on an interface. Exemplarily, the map control is a control displayed on a local region of a presentation interface of the audiovisual work. A plurality of candidate map points may be displayed on the map control. The candidate map points are map points that appear in the plot. Optionally, the candidate map points are map points where a plot element in the plot appears. The plot element includes, but is not limited to: at least one of a plot character and a plot prop.

The map control in this embodiment of this application is independent of a playback progress bar, and the map point on the map in the map control is different from a plot time point on the playback progress bar that is used for representing a starting point of a particular plot. A display position of the map point, serving as a coordinate point on a spatial dimension, in the map is not directly related to a time when the plot element appears.

Optionally, the computer device highlights, on the map control, a map point corresponding to a plot clip being played; or the computer device highlights, on the map control, a map point corresponding to a target plot element being played. The highlighting including: at least one of bold display, enlarged display, inverse color display, a foreground color change, a background color change, addition of an animation special effect, and addition of an avatar or icon of the target plot element. When the map point where the target plot element is located is switched from a first map point to a second map point, the highlighting is automatically switched from the first map point to the second map point on the map control.

For example, if the plot clip being played currently is a plot clip located at a map point 1, the map point 1 is highlighted on the map control. In another example, if a target plot character being played currently is a protagonist A located at a map point 2, an avatar of the protagonist A is displayed on the map point 2 of the map control to highlight the map point 2.

Step 240: Determine a map marker point on the map in response to a location marking operation on the map.

The location marking operation is an operation for selecting a map marker point on the map. The location marking operation may include at least one of a click operation, a drag operation, a double-click operation, a voice operation, a pressure touch operation, an eye control, and a somatosensory control, which is not limited in this application.

For example, when the user operates using a mouse, the location marking operation is an operation of clicking on the map using a left mouse button. In another example, when the user operates using a touchscreen, the location marking operation is a drag operation on the touchscreen by the user's finger.

Step 260: Present a plot clip in the audiovisual work that corresponds to the map marker point.

Optionally, when the audiovisual work is a video or an audio, the computer device plays a plot clip in the audiovisual work that corresponds to the map marker point. When the audiovisual work is a literary work, the computer device displays a text clip, such as a chapter, a section, a page, or a paragraph, in the audiovisual work that corresponds to the map marker point. When the audiovisual work is a comic work, the computer device displays a graphic clip in the audiovisual work that corresponds to the map marker point.

Figure 3:
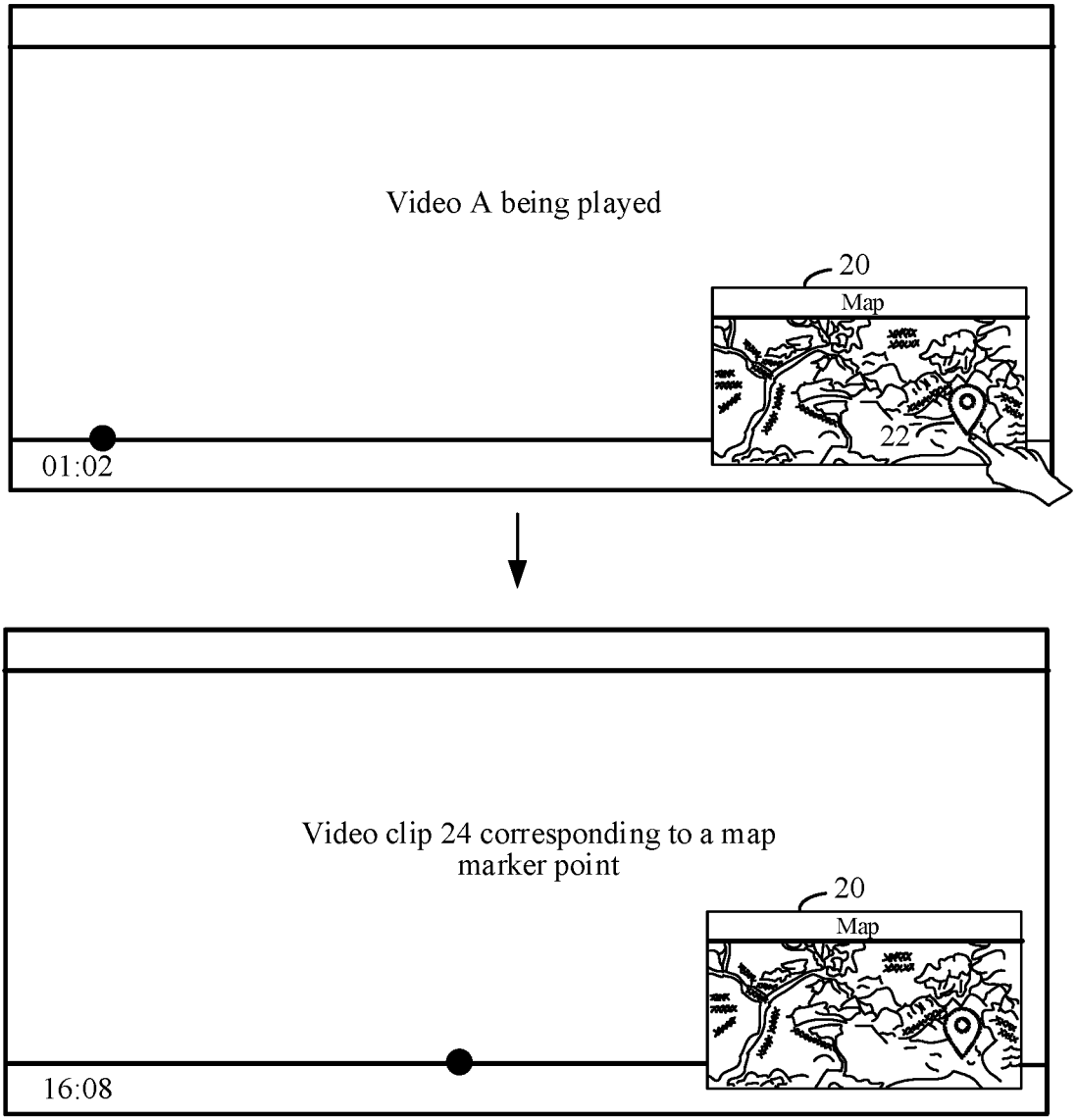
FIG. 3 is a diagram of an interface of a method for presenting an audiovisual work according to an exemplary embodiment.

Exemplarily, referring to FIG. 3, using an example in which the audiovisual work is a video, the computer device is playing a video A, and when the user drags a playback progress bar of the video A, a map control 20 is displayed on a playback interface of the video A. When the user clicks on the map control 20, a map marker point 22 may be selected. The computer device jumps to a video clip 24 corresponding to the map marker point 22 for playing.

In conclusion, according to the method provided in this embodiment, by displaying a map associated with a plot of an audiovisual work, and presenting, in response to a map marker point selected by the user on the map, a plot clip in the audiovisual work that corresponds to the map marker point, a map-based jumping presentation solution can be provided. In this way, the user can switch between different plot clips based on the map marker point on the map for presentation, and a more efficient human-machine interaction solution is provided for audiovisual works in a type of inverted shooting, random shooting, decrypted subject, long giant production, and the like.

In this embodiment of this application, the map control is not displayed throughout the presentation process of the audiovisual work, and the computer device may display the map control or cancel the display of the map control when a certain trigger condition is satisfied. In addition, the user may select the map marker point by dragging a location marking control, so that the computer device displays the plot clip corresponding to the map marker point.

Figure 4:
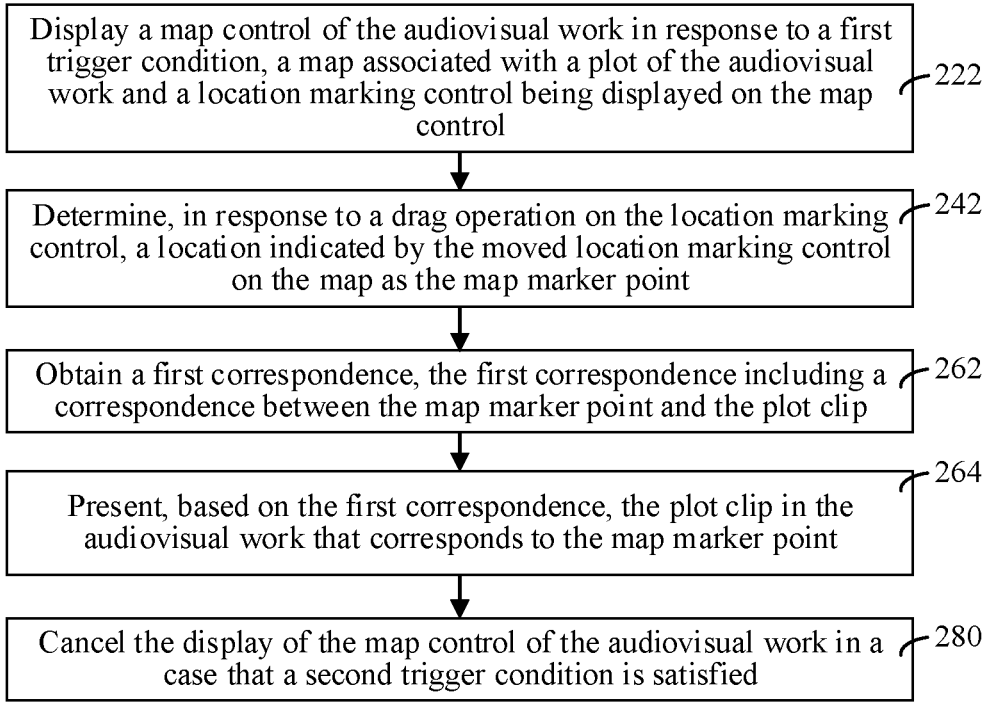
FIG. 4 is a flowchart of a method for presenting an audiovisual work according to an exemplary embodiment.

FIG. 4 is a flowchart of a method for presenting an audiovisual work according to another exemplary embodiment of this application. The method includes:

Step 222: Display a map control of the audiovisual work in response to a first trigger condition, a map associated with a plot of the audiovisual work and a location marking control being displayed on the map control.

The first trigger condition includes, but is not limited to, at least one of the following conditions:

A presentation starting operation on the audiovisual work is received.

The presentation starting operation includes: an operation of starting to play the audiovisual work, an operation of starting to listen to the audiovisual work, an operation of starting to display the audiovisual work, and the like, which is not limited in this embodiment of this application. In response to the presentation starting operation, the computer device starts to present the audiovisual work and displays the map control of the audiovisual work.

A drag operation or a jump operation on a playback progress bar of the audiovisual work is received.

Exemplarily, in a case that the audiovisual work is a video or an audio, when receiving a drag operation or a jump operation on the playback progress bar of the audiovisual work, the computer device predicts that at a certain probability, the user has a jump intention of jumping based on the map control for playing. In this case, the computer device displays the map control.

The drag operation on the playback progress bar of the audiovisual work is received, and a drag distance of the drag operation is greater than a first threshold.

Exemplarily, in a case that the audiovisual work is a video or an audio, when receiving a large drag operation on the playback progress bar of the audiovisual work, the computer device predicts that at a certain probability, the user has a jump intention of jumping based on the map control for playing. In this case, the computer device displays the map control. Optionally, the first threshold may be 10%, 20%, 30%, or the like of the total length of the playback progress bar.

The jump operation on the playback progress bar of the audiovisual work is received and a quantity of times for performing the jump operation is greater than a second threshold.

Exemplarily, in a case that the audiovisual work is a video or an audio, when receiving a plurality of times of jump operations on the playback progress bar of the audiovisual work, the computer device predicts that at a certain probability, the user has a jump intention of jumping based on the map control for playing. In this case, the computer device displays the map control. Optionally, the second threshold may be 3 times, 5 times, or the like.

A fast-forward operation or a fast-rewind operation on the audiovisual work is received.

Exemplarily, in a case that the audiovisual work is a video or an audio, when receiving a fast-forward operation or a fast-rewind operation on the playback progress bar of the audiovisual work, the computer device predicts that at a certain probability, the user has a jump intention of jumping based on the map control for playing. In this case, the computer device displays the map control.

An open operation on a directory of the audiovisual work, the jump operation, a forward operation, or a backward operation is received.

Exemplarily, in a case that the audiovisual work is a text work or a comic work, when receiving an open operation on a directory of the audiovisual work, a jump operation, a forward operation, or a backward operation, the computer device predicts that at a certain probability, the user has a jump intention of jumping based on the map control for playing. In this case, the computer device displays the map control.

Playback of the audiovisual work is performed to a specified progress on the playback progress bar.

The specified progress is a playback moment at which map information is pre-embedded.

Exemplarily, in a case that the audiovisual work is a video or an audio, if a map information display embedding point is arranged at 40% of the playback progress of the audiovisual work, the computer device starts to display the map control when the audiovisual work is played to 40% of the progress bar.

Exemplarily, in a case that the audiovisual work is a text work or a comic book work, if the map information display embedding point is arranged at Chapter 5 of the audiovisual work, the computer device starts to display the map control when reading to Chapter 5.

In response to at least one of the foregoing conditions, the computer device displays the map control of the audiovisual work.

Exemplarily, the map associated with the plot of the audiovisual work and a location marking control are displayed on the map control. The location marking control is a control configured to select the map marker point. For example, the location marking control is a map flag, a floating water drop, a triangle indicator, a floating cubic cone, or the like.

Exemplarily, the map control displays one or more maps. When there are a plurality of maps to display, the user may swipe left and right or up and down on the map control, and the computer device switches between different map for display in response to the swiping operation on the map control. Alternatively, the computer device simultaneously displays a plurality of candidate maps, and displays a selected target map in response to a confirmation operation of the user.

Step 242: Determine, in response to a drag operation on the location marking control, a location indicated by the moved location marking control (via the drag operation) on the map as the map marker point.

Exemplary, the location marking operation includes: a drag operation on the location marking control. The user may drag the location marking control to any position on the map.

Exemplarily, one or more candidate map points are displayed on the map. The candidate map points are position points that are allowed to be used as the map marker point, and other position points except the candidate map points are position points that are not allowed to be used as the map marker point.

In a possible embodiment, in response to the drag operation on the location marking control, the computer device determines a candidate map point on the map that is closest to the moved location marking control as the map marker point.

Exemplarily, in a case that an end position of the drag operation does not coincide with the closest candidate map point, the computer device displays an adsorption animation in which the location marking control is absorbed to the closest candidate map point, thereby allowing the user to perceive that the map marker point selected by the user is the candidate map point closest to the moved location marking control.

Step 262: Obtain a first correspondence, the first correspondence including a correspondence between the map marker point and the plot clip.

The first correspondence includes a correspondence between different locations and different plot clips. The plot clip is represented by a start time point or by a start time point and an end time point.

Figure 5:
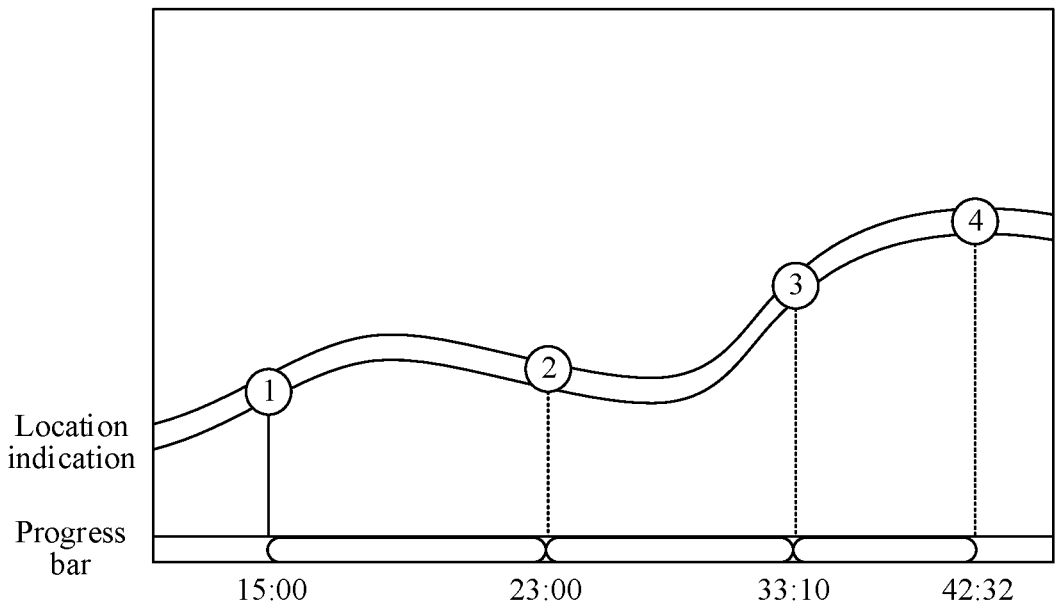
FIG. 5 is a diagram of an interface of a method for presenting an audiovisual work according to an exemplary embodiment.

Exemplarily, as shown in FIG. 5, a plot clip corresponding to a location 1 starts from 15:00 on the playback progress bar; a plot clip corresponding to a location 2 starts from 23:00 on the playback progress bar; a plot clip corresponding to a location 3 starts from 33:10 on the playback progress bar; and a plot clip corresponding to a location 4 starts from 42:32 on the playback progress bar.

Step 264: Present, based on the first correspondence, the plot clip in the audiovisual work that corresponds to the map marker point.

Exemplarily, assuming that the map marker point selected by the user is the location 3, the computer device starts to play the plot clip corresponding to the location 3 from 33:10 of the playback progress bar.

In an optional design, the following steps are further included before step 264: The computer device displays a fast-forward animation in a case that a plot clip currently being presented is earlier than the plot clip corresponding to the map marker point. The fast-forward animation may be represented by a plurality of video frames played quickly, by a fast-forward arrow identifier that moves forward, or by a fast-flip sound or animation effect. After the playback is fast-forwarded to the plot clip corresponding to the map marker point, the computer device starts to present the plot clip in the audiovisual work that corresponds to the map marker point.

In an optional design, the following steps are further included before step 264: The computer device displays a fast-rewind animation in a case that the plot clip currently being presented is later than the plot clip corresponding to the map marker point. The fast-rewind animation may be represented by a plurality of video frames played quickly, by a fast-rewind arrow identifier that moves forward, or by a fast-flip sound or animation effect. After the playback is fast-rewound to the plot clip corresponding to the map marker point, the computer device starts to present the plot clip in the audiovisual work that corresponds to the map marker point.

After presenting the plot clip in the audiovisual work that corresponds to the map marker point, the computer device may resume to the original playback progress and continue to play, or may continuously play from the plot clip corresponding to the map marker point.

In another possible embodiment, in the process of playing the audiovisual work, in order to prevent that the map control continuously displayed obscures the screen of the audiovisual work, the computer device may alternatively cancel the display of the map control of the audiovisual work.

Step 280: Cancel the display of the map control of the audiovisual work in a case that a second trigger condition is satisfied.

The second trigger condition includes, but is not limited to, any one of the following conditions:

A turn-off operation for turning off the map control is received.

Exemplary, when the computer device receives a click operation on a turn-off control for the map control, the map control is turned off, or when the computer device receives a playback exit operation for the audiovisual work, the map control is turned off.

No operation has been received on the map control for a duration greater than a third threshold.

Exemplary, when the user does not operate on the map control for a long time, the computer device turns off the map control in order to avoid the effect of the long-term map control display on the screen content of the audiovisual work. Optionally, the third threshold may be 5 minutes, 10 minutes, or the like.

The plot clip starts to be played.

Exemplarily, in a case that the audiovisual work is a video or an audio, when the computer device finishes playing the plot clip corresponding to the map marker point, the computer device starts to play the next plot clip, and because the plot clip is not marked on the map of the map control, the computer device turns off the map control.

A human-machine interaction operation is received on an interaction region other than the map control.

Optionally, the other interaction region may be inside the client or outside the client (for example, a human-machine interaction operation on an other application program). In this embodiment of this application, when a certain trigger condition is satisfied, the computer device may display or turn off the map control, which improves the intelligence of the map control display, and reduces the occlusion caused by continuous display of the map control on the screen of the audiovisual work. In addition, the user may select the map marker points by dragging the location marking control, which improves the marking accuracy of the map marker points, and further improves the human-machine interaction efficiency.

Figure 6:
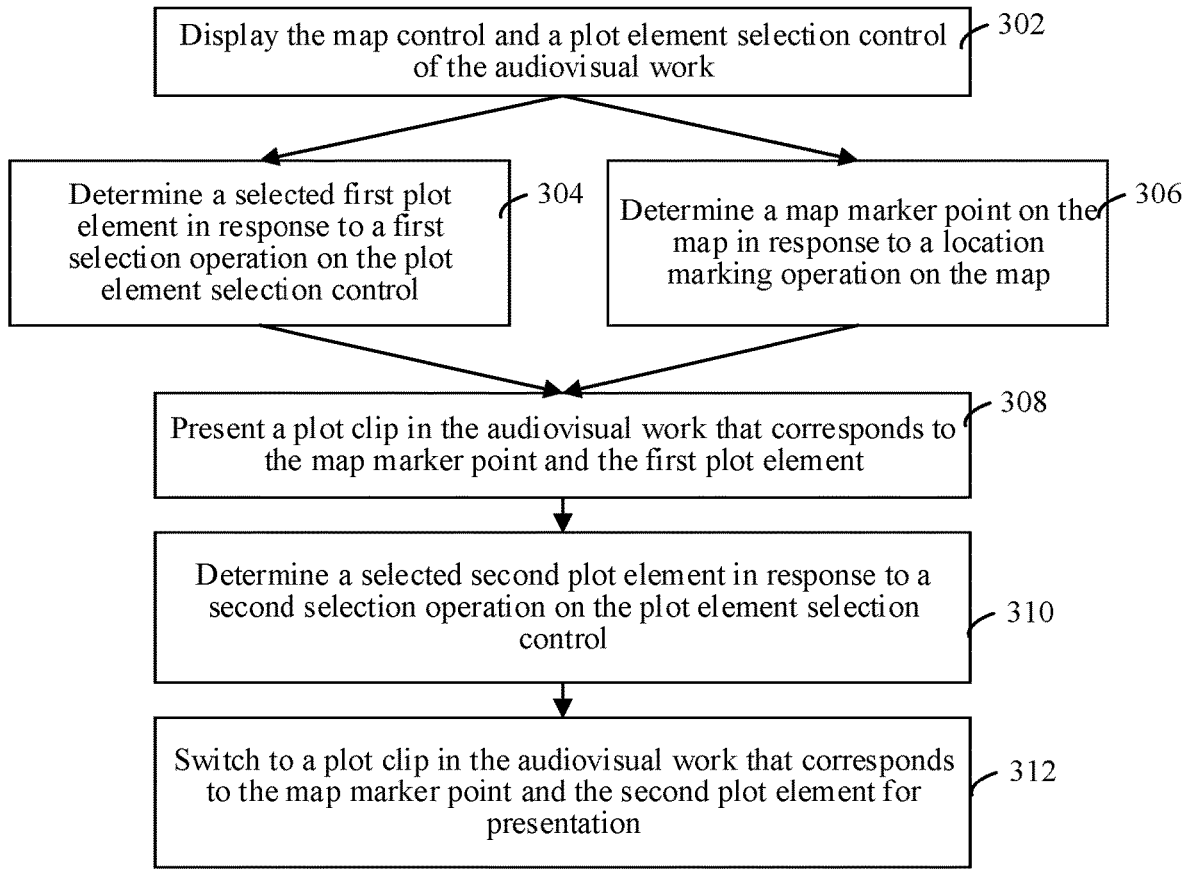
FIG. 6 is a flowchart of a method for presenting an audiovisual work according to an exemplary embodiment.

The plot in the audiovisual work is not only related to the map, it may also be related to the time (such as an era, an age, a year) in the plot, a character in the plot, and an item in the plot. Therefore, the embodiments of this application further provide the following embodiment:

FIG. 6 is a flowchart of a method for presenting an audiovisual work according to an exemplary embodiment of this application. The method includes:

Step 302: Display the map control and a plot element selection control of the audiovisual work.

Plot elements include: a time in the plot, a character in the plot, an item in the plot, and the like, which are not limited in this embodiment of this application. This embodiment is described using an example in which the plot element is a character in the plot, but the specific type of the plot element is not limited.

The plot element selection control is a control configured to select one or more plot elements among a plurality of plot elements. The plot element selection control may be a button, a menu, a list, and the like. This embodiment is described using an example in which the plot element selection control is a plurality of buttons, and each button corresponding to a character.

In an embodiment, the plot element selection control and the map control are displayed simultaneously, or the display of the two are canceled simultaneously. In an embodiment, the plot element selection control and the map control may not be displayed simultaneously, or the display of the two may not be canceled simultaneously.

Figure 7:
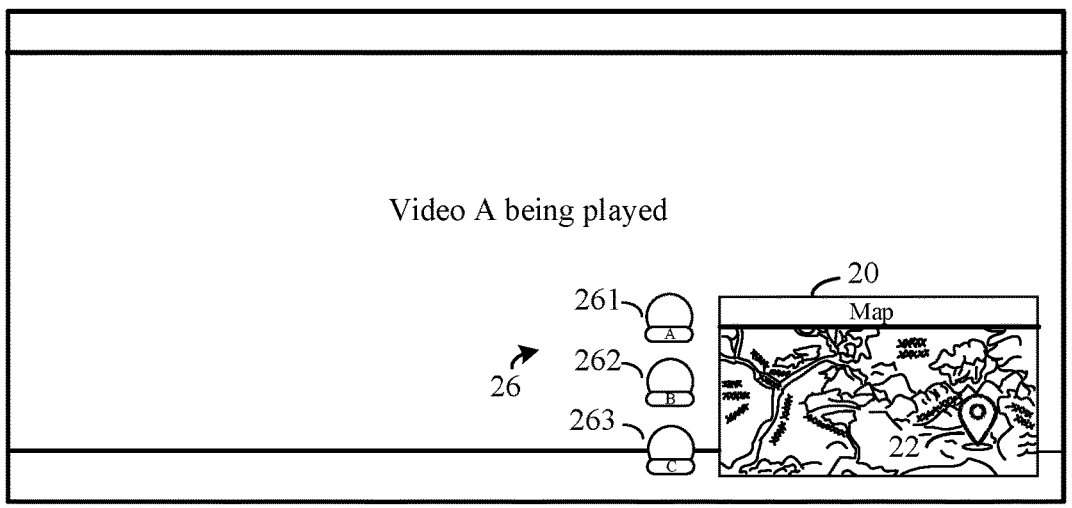
FIG. 7 is a diagram of an interface of a method for presenting an audiovisual work according to an exemplary embodiment.

Exemplarily, as shown in FIG. 7, the computer device displays the map control 20 and a plot element selection control 26 of the audiovisual work simultaneously in response to the first trigger condition being satisfied. The plot element selection control 26 includes a selection button 261 corresponding to an actor A, a selection button 262 corresponding to an actor B, and a selection button 263 corresponding to an actor C. Optionally, the map associated with the plot of the audiovisual work and a location marking control 22 are displayed on the map control 20.

Step 304: Determine a selected first plot element in response to a first selection operation on the plot element selection control.

The first selection operation is an operation for selecting the plot element on the plot element selection control. The first selection operation may be at least one of a click operation, a drag operation, a double-click operation, a voice operation, a pressure touch operation, an eye control, and a somatosensory control, which is not limited in this application.

The first plot element is one of the plurality of plot elements.

Step 306: Determine a map marker point on the map in response to a location marking operation on the map.

The location marking operation is an operation for selecting a map marker point on the map. The location marking operation may be at least one of a click operation, a drag operation, a double-click operation, a voice operation, a pressure touch operation, an eye control, and a somatosensory control, which is not limited in this application.

For example, when the user operates using a mouse, the location marking operation is an operation of clicking on the map using a left mouse button. In another example, when the user operates using a touchscreen, the location marking operation is a drag operation on the touchscreen by the user's finger.

In this embodiment, an order of performing step 304 and step 306 is not limited. Step 304 may be performed before step 306, or step 306 may be performed before step 304.

Step 308: Present a plot clip in the audiovisual work that corresponds to the map marker point and the first plot element.

Optionally, when the audiovisual work is a video or an audio, the computer device plays a plot clip in the audiovisual work that simultaneously corresponds to the map marker point and the first plot element. When the audiovisual work is a literary work, the computer device displays a text clip, such as a chapter, a section, a page, or a paragraph, in the audiovisual work that simultaneously corresponds to the map marker point and the first plot element. When the audiovisual work is a comic work, the computer device displays a graphic clip in the audiovisual work that simultaneously corresponds to the map marker point and the first plot element.

Figure 8:
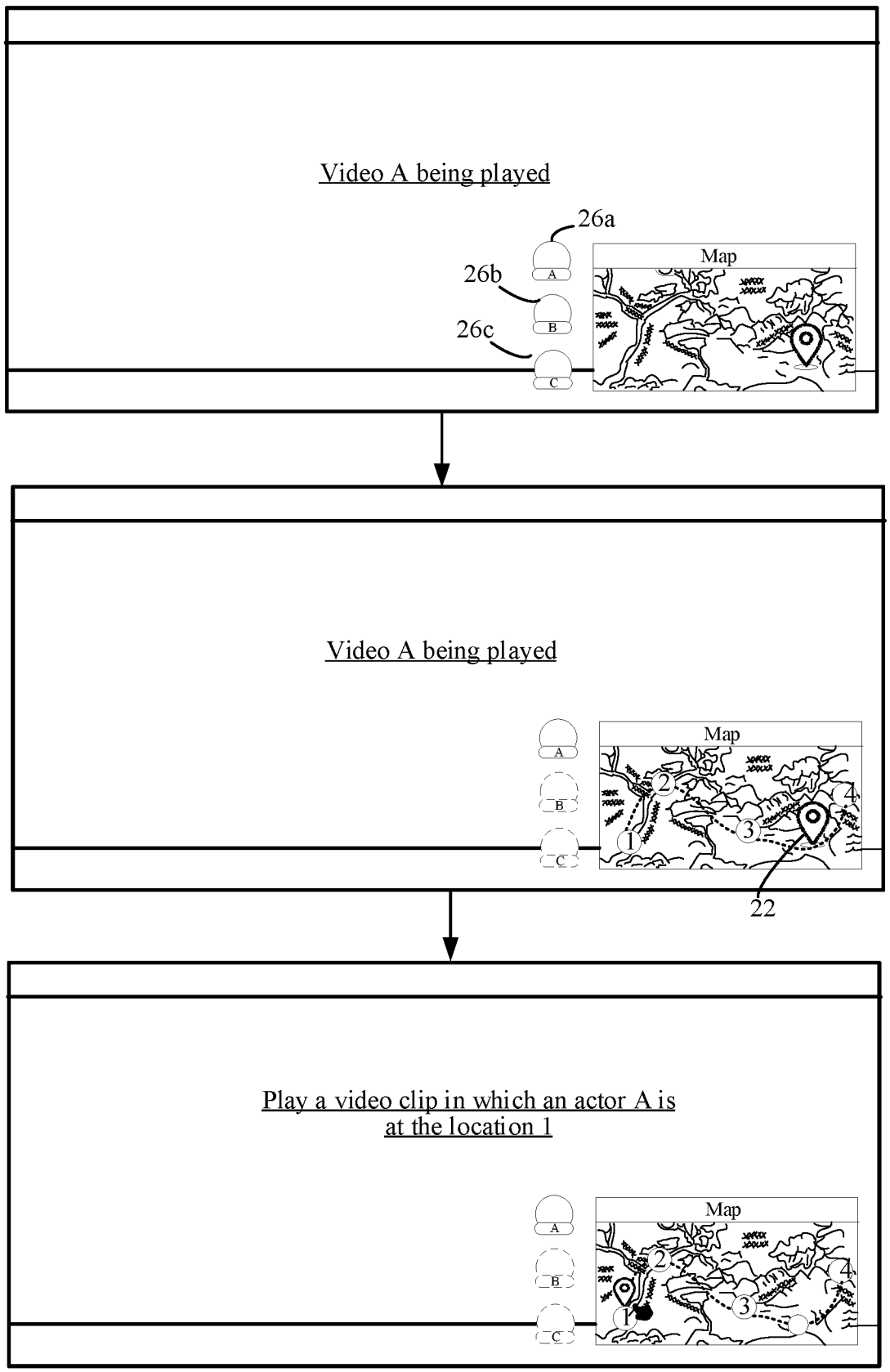
FIG. 8 is a diagram of an interface of a method for presenting an audiovisual work according to an exemplary embodiment.

In an example where the first plot element is selected before the map marker point is selected, as shown in FIG. 8:

A selection button 26a of the actor A, a selection button 26b of the actor B, a selection button 26c of the actor C, and the map control 20 are displayed on the computer device, and the location marking control 22 is displayed on the map control 20. In response to a click operation triggered by the user on the selection button 26a of the actor A, the computer device displays candidate map points 1, 2, 3, and 4 corresponding to the actor A on the map control 20. In response to the drag operation on the location marking control 22 by the user, the computer device determines the location 1 closest to the dragged location marking control 22 as the map marker point, and displays a video clip in which the actor A appears at the location 1.

That is, in response to determining the first plot element, the computer device displays candidate map points corresponding to the first plot element on the map control. The candidate map point is a position point that is allowed to be used as the map marker point, and other position point except the candidate map point is a position point that is not allowed to be used as the map marker point. The candidate map point corresponding to the first plot element is the candidate map point where the first plot element appears. If candidate map points that do not correspond to the first plot element further exist, these candidate map points are not displayed, or are displayed in an unselectable style.

Exemplarily, after the first plot element is determined, the plot element selection control corresponding to the first plot element is highlighted. For example, the selection button corresponding to the actor A is displayed in an enlarged and bolded manner.

Exemplarily, in response to the drag operation on the location marking control, the computer device determines a candidate map point on the map that is closest to the moved location marking control as the map marker point. In a case that an end position of the drag operation does not coincide with the closest candidate map point, the computer device displays an adsorption animation in which the location marking control is absorbed to the closest candidate map point, thereby allowing the user to perceive that the map marker point selected by the user is the candidate map point closest to the moved location marking control.

Exemplarily, after the first plot element is determined, timeline information of the first plot element is displayed on the map control based on each map point according to a time sequence of occurrence of the first plot element on each map point. For example, as shown in FIG. 8, a sequence number is displayed on each map point of the map control, and a connection line is displayed between two map points with adjacent sequence numbers, the sequence number being used for indicating the time sequence in which the first plot element A appears in each map point. Alternatively, an arrow line is displayed between each map point of the map control, the arrow line being used for representing a time sequence in which the first plot element A appears in two adjacent map points.

Figure 9:
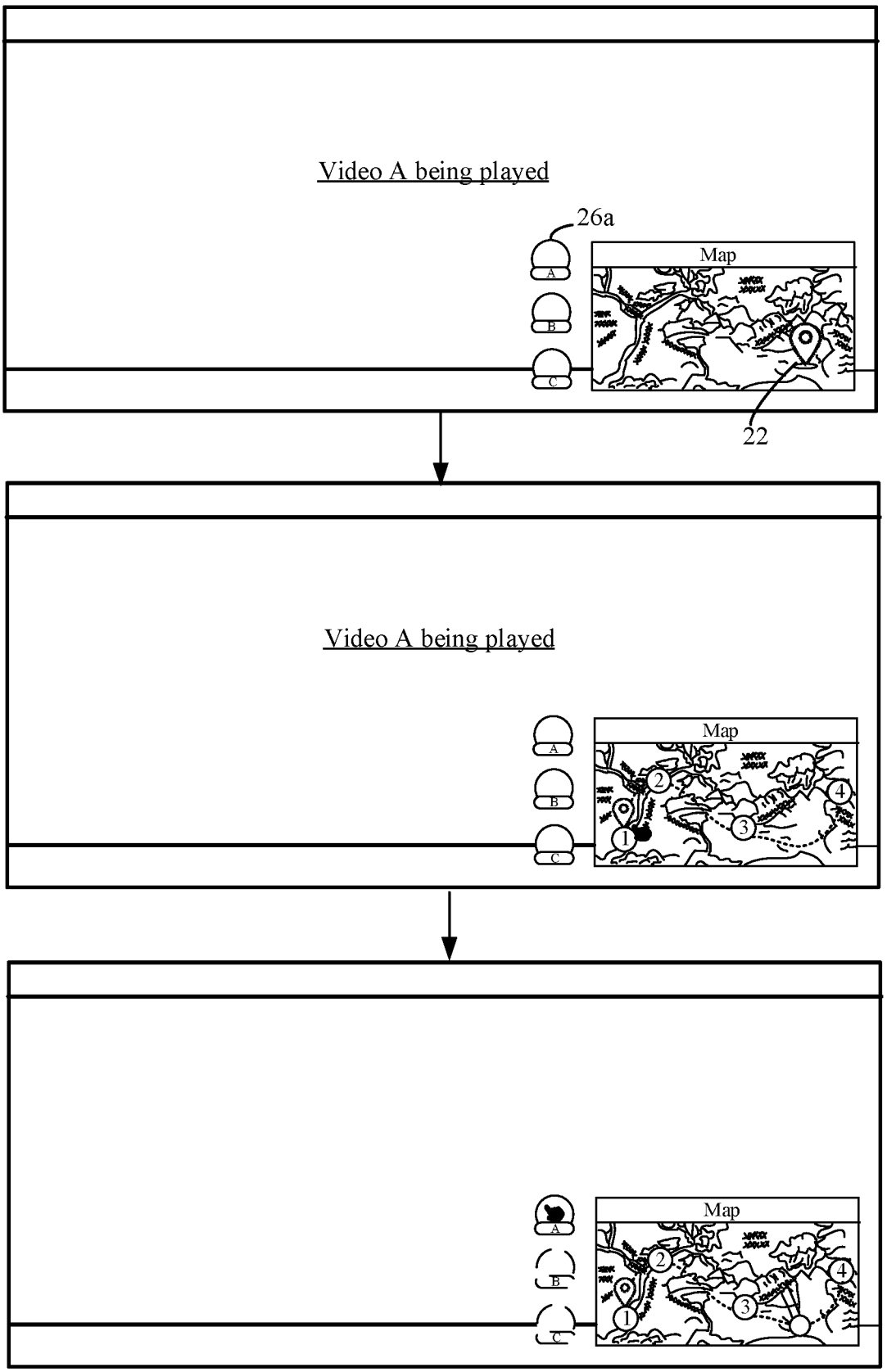
FIG. 9 is a diagram of an interface of a method for presenting an audiovisual work according to an exemplary embodiment.

In an example where the map marker point is selected before the first plot element is selected, as shown in FIG. 9:

A selection button 26a of the actor A, a selection button of the actor B, a selection button of the actor C, and the map control 20 are displayed on the computer device, and the location marking control 22 is displayed on the map control 20.

In an initial state, the map point indicated by the location marking control 22 is a map point corresponding to the current plot. In response to receiving a touch operation (a start touch event) on the location marking control 22, the computer device displays the plurality of candidate map points on the map control. The candidate map points are position points that are allowed to be used as the map marker point, and other position points except the candidate map points are position points that are not allowed to be used as the map marker point. Optionally, the plurality of candidate map points are map points where at least two plot elements appear. The map points in which different plot elements appear may be displayed in different styles.

In response to receiving the drag operation on the location marking control 22, the computer device determines the location 1 closest to the dragged location marking control 22 as the map marker point, for example, selecting the location 1 as the map marker point.

After determining the map marker point, the computer device displays a plot element selection control of at least one candidate plot element that corresponds to (or appears in) the map marker point. In response to a click operation triggered by the user on the selection button 26a of the actor A, the computer device displays the video clip in which the actor A appears at the location 1.

The plurality of candidate plot elements corresponding to the selected map marker points are candidate plot elements that appear at the map marker point. If other candidate map elements that do not appear in the map marker point further exist, these other candidate map elements are not displayed, or are displayed in an unselectable style.

Exemplarily, after the first plot element is determined, the plot element selection control corresponding to the first plot element is highlighted. For example, the selection button corresponding to the actor A is displayed in an enlarged and bolded manner.

Exemplarily, in response to the drag operation on the location marking control, the computer device determines a candidate map point on the map that is closest to the moved location marking control as the map marker point. In a case that an end position of the drag operation does not coincide with the closest candidate map point, the computer device displays an adsorption animation in which the location marking control is absorbed to the closest candidate map point, thereby allowing the user to perceive that the map marker point selected by the user is the candidate map point closest to the moved location marking control.

Step 310: Determine a selected second plot element in response to a second selection operation on the plot element selection control.

Optionally, in the process of displaying the plot clip corresponding to the map marker point and the first plot element by the computer device, in a case that the plot clip corresponding to the second plot element exists at the map marker point, a plot button corresponding to the second plot element is displayed in a selectable style.

Optionally, when the plot clip corresponding to the second plot element exists at the currently selected map marker point, the plot button corresponding to the second plot element is displayed in a selectable style.

The user may re-select the second plot element on the plot element selection control in the process of watching the plot clip corresponding to the first plot element. In response to the second selection operation on the plot element selection control, the computer device determines the selected second plot element.

Step 312: Switch to a plot clip in the audiovisual work that corresponds to the map marker point and the second plot element for presentation.

In this embodiment of this application, after determining the selected second plot element, the computer device switches the content of the audiovisual work for presentation, that is, the plot clip corresponding to the map marker point and the first plot element is switched to the plot clip corresponding to the map marker point and the second plot element.

Exemplarily, the map marker point 1 corresponds to three candidate plot elements, namely a character A, a character B, and a character C. The user clicks the plot element selection control corresponding to the first plot element character A, and the computer device displays the plot clip A corresponding to the map marker point 1 and the first plot element character A. During the playback of the plot clip A, the user then clicks the plot element selection control corresponding to the second plot element character B, the content displayed by the computer device is switched from the plot clip A corresponding to the map marker point 1 and the first plot element character A to the plot clip B corresponding to the map marker point 1 and the second plot element character B. According to the method provided in this embodiment, different plot elements are further selected in the playback process, and thereby switching between the plot clips respectively corresponding to the first plot element and the second plot element may be implemented. In this way, the user can switch between different plot clips corresponding to different plot elements of the same map marker point for presentation, thereby further improving the human-machine interaction efficiency.

In an optional embodiment based on FIG. 6, step 308 has a variety of technical implementations, which includes but not limited to at least one of the following technical implementations:

First implementation: The computer device presents a plot clip in the audiovisual work that corresponds to the map marker point and the first plot element based on the correspondence.

The computer device obtains a second correspondence, the second correspondence including a correspondence among the map marker point, the first plot element, and the plot clip. The computer device presents, based on the second correspondence, the plot clip in the audiovisual work that corresponds to the map marker point and the first plot element.

That is, a correspondence among the map marker point, the first plot element, and the plot clip are preset in the computer device. The correspondence may be stored as a data table, database, or the like. After determining the map marker point and the first plot element, the computer device uses the map marker point and the first plot element as the query input, and query to obtain the corresponding plot clip.

Second implementation: The computer device presents a plot clip in the audiovisual work that corresponds to the map marker point and the first plot element based on face recognition.

It is assumed that the audiovisual work includes a video, and the first plot element includes a first character. The first character is an actor A.

The computer device obtains a first correspondence, the first correspondence including a correspondence between the map marker point and the plot clip; determines video clips corresponding to the map marker point based on the first correspondence; identifies a video clip corresponding to the first character among the video clips corresponding to the map marker point, the video clip including at least one of a face video frame and a voice audio frame of the first character; and displays the video clip.

That is, after the candidate video clips corresponding to the map marker point are obtained, the video clip corresponding to the first character is determined among the candidate video clips based on the face recognition technique. The video frame in the video clip contains the face of the first character.

Third implementation: The computer device presents a plot clip in the audiovisual work that corresponds to the map marker point and the first plot element based on speech recognition.

It is assumed that the audiovisual work includes an audio.

The computer device obtains a first correspondence, the first correspondence including a correspondence between the map marker point and the plot clip; determines audio clips corresponding to the map marker point based on the first correspondence; identifies an audio clip including a keyword of the first plot element among the audio clips corresponding to the map marker point; and plays the audio clip.

That is, after obtaining the candidate audio clips corresponding to the map marker point, the computer device determines the audio clip corresponding to the first character among the candidate audio clips based on the speech recognition technique. The audio frame in the audio clip contains a sound feature of the first character.

Fourth implementation: The computer device presents a plot clip in the audiovisual work that corresponds to the map marker point and the first plot element based on a text match.

It is assumed that the audiovisual work includes a literary work.

The computer device obtains a first correspondence, the first correspondence including a correspondence between the map marker point and the plot clip; determines chapter clips corresponding to the map marker point based on the first correspondence; identifies a chapter clip including a keyword of the first plot element among the chapter clips corresponding to the map marker point; and displays the chapter clip.

Exemplarily, at least one of a chapter, a section, a speech, a page, a paragraph, and a line may be used as the unit of measurement for the chapter clip.

Figure 10:
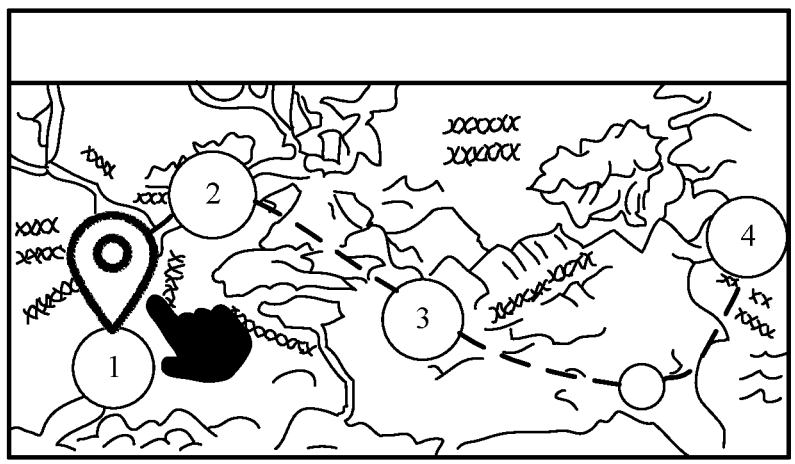
FIG. 10 is a schematic diagram of an interface of a map control according to an exemplary embodiment.

In an optional implementation based on the foregoing embodiments, the foregoing method further includes the following optional steps: displaying timeline information on the map control based on each map point, the timeline information being used for indicating a time sequence in which each map point appears in the plot. This step includes at least the following two optional designs:

First, exemplarily, as shown in FIG. 10, a sequence number is displayed on each map point of the map control, and a connection line is displayed between two map points with adjacent sequence numbers, the sequence number being used for representing a time sequence in which the corresponding map point appears in the plot.

Figure 11:
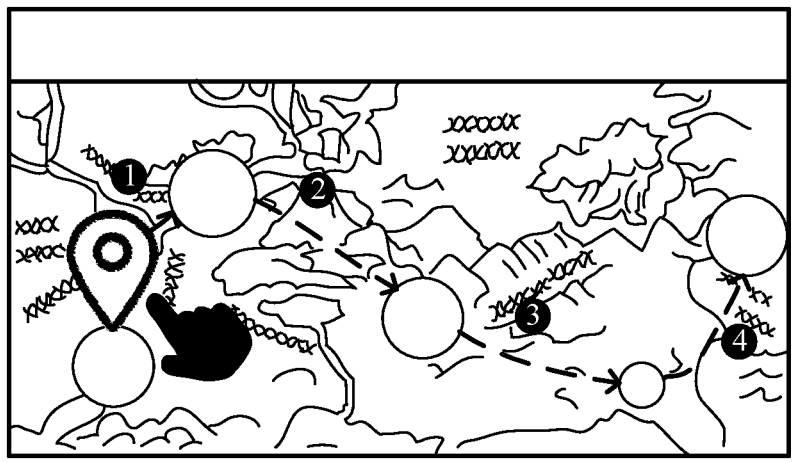
FIG. 11 is a schematic diagram of an interface of a map control according to another exemplary embodiment.

Second, exemplarily, as shown in FIG. 11, an arrow line is displayed between each map point of the map control, the arrow line being used for representing a time sequence in which two adjacent map points appear in the plot.

Figure 12:
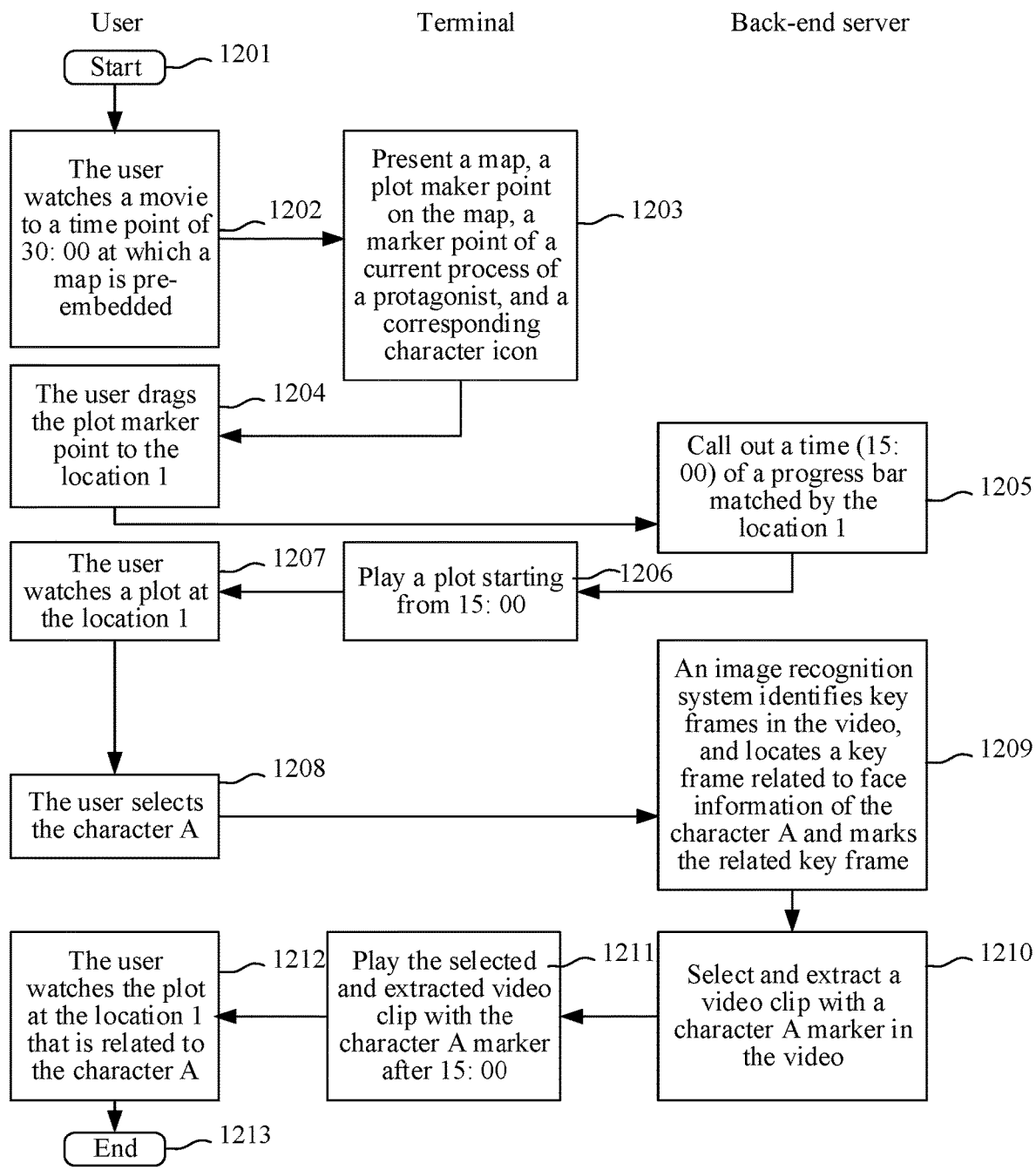
FIG. 12 is a flowchart of a method for presenting an audiovisual work according to an exemplary embodiment.

In a schematic example shown in FIG. 12, with reference to the correspondence shown in FIG. 5, the method is performed collaboratively by a user, a terminal, and a back-end server.

Step 1201: Start.

Step 1202: The user watches a movie to a time point of 30:00 at which a map is pre-embedded.

Step 1203: The terminal presents a map provided by the movie producer, a plot maker point (the location 1, the location 2, or the like) on the map, a marker point of a current process of a protagonist, and a character icon in the play (a protagonist A, a protagonist B, or the like), The character icon in the play is a selection button of the character in the play.

Step 1204: The user drags the plot marker point to the location 1 on the map.

Step 1205: The back-end server calls out a time point (15:00) of a plot progress bar matched by the location 1, and feeds back the time point to the terminal.

Step 1206: The terminal starts to play a movie clip starting from 15:00.

Step 1207: The user watches a plot at the location 1.

Step 1208: The user selects the protagonist A.

Step 1209: The back-end server identifies key frames in the entire video according to the image recognition technology, and marks a key frame in which the protagonist A appears.

Step 1210: The back-end server selects and extracts a video clip from the key frame with a protagonist A marker in the video, and feeds back the video clip to the terminal.

Step 1211: The terminal starts to play the video clip with the character A marker after 15:00.

Step 1212: The user watches the plot at the location 1 that is related to the character A.

Step 1213: End.

Figure 13:
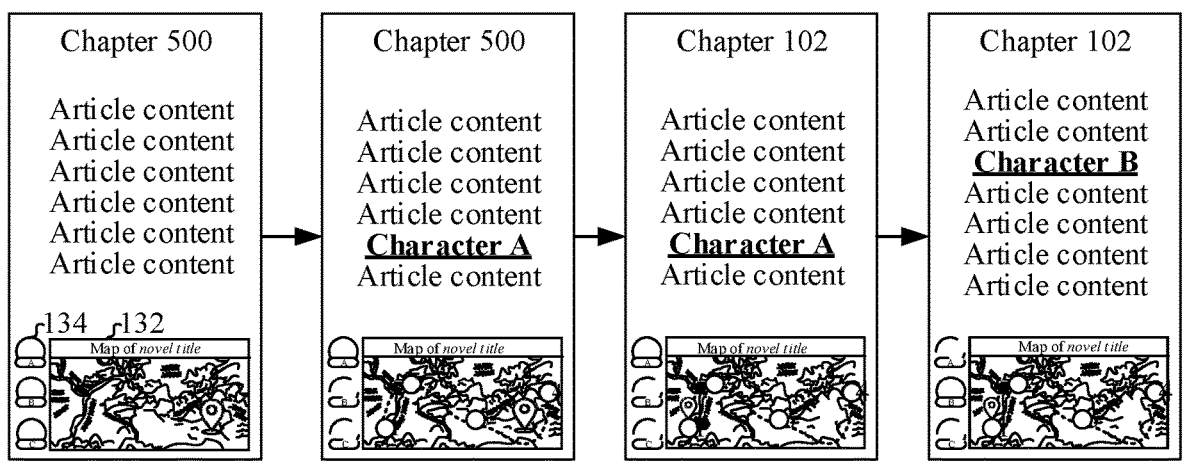
FIG. 13 is a diagram of an interface of a method for presenting an audiovisual work according to an exemplary embodiment.

In another exemplary example, the foregoing method may alternatively be applied to a novel reading scenario. As shown in FIG. 13, when the user reads an article content in Chapter 500, a display map control 132 and a character selection control 134 are triggered. The character selection control 134 includes: a selection control for a character A, a selection control for a character B, and a selection control for a character C. After the user selects the character A, the terminal jumps to a paragraph clip corresponding to the character A in Chapter 500 for display. After the user selects the location 1 in the map control 132, assuming that Chapter 102 is a description chapter corresponding to the location 1, the terminal jumps to a paragraph clip corresponding to the character A in Chapter 102 for display. After the user then selects the character B, the terminal jumps to a paragraph clip corresponding to the character B in Chapter 102 for display.

Figure 14:
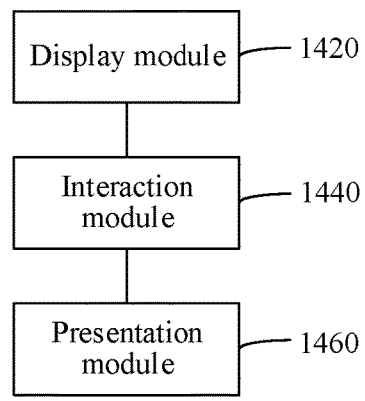
FIG. 14 is a block diagram of an apparatus for presenting an audiovisual work according to an exemplary embodiment.

FIG. 14 is a block diagram of an apparatus for presenting an audiovisual work according to an exemplary embodiment of this application. In this disclosure, a unit and a module may be hardware such as a combination of electronic circuitries; firmware; or software such as computer instructions. The unit and the module may also be any combination of hardware, firmware, and software. In some implementation, a unit may include at least one module. The apparatus includes:

a display module 1420, configured to display a map control of the audiovisual work, a map associated with a plot of the audiovisual work being displayed on the map control;

an interaction module 1440, configured to determine a map marker point on the map in response to a location marking operation on the map; and a presentation module 1460, configured to present a plot clip in the audiovisual work that corresponds to the map marker point.

In an optional design of this embodiment, a location marking control is displayed on the map; and the interaction module 1440 is configured to determine, in response to a drag operation on the location marking control, a location indicated by the moved location marking control on the map as the map marker point.

In an optional design of this embodiment, candidate map points are displayed on the map; and the interaction module 1440 is configured to determine, in response to the drag operation on the location marking control, a candidate map point on the map that is closest to the moved location marking control as the map marker point.

In an optional design of this embodiment, the presentation module 1460 is configured to: obtain a first correspondence, the first correspondence including a correspondence between the map marker point and the plot clip; and present, based on the first correspondence, the plot clip in the audiovisual work that corresponds to the map marker point.

In an optional design of this embodiment, the apparatus further includes:

the display module 1420, configured to display a plot element selection control of the audiovisual work;

the interaction module 1440, configured to determine a selected first plot element in response to a first selection operation on the plot element selection control; and the presentation module 1460, configured to present a plot clip in the audiovisual work that corresponds to the map marker point and the first plot element.

In an optional design of this embodiment, the interaction module 1440 is configured to determine a selected second plot element in response to a second selection operation on the plot element selection control; and the presentation module 1460 is configured to switch to a plot clip in the audiovisual work that corresponds to the map marker point and the second plot element for presentation.

In an optional design of this embodiment, the presentation module 1460 is configured to: obtain a second correspondence, the second correspondence including a correspondence among the map marker point, the first plot element, and the plot clip; and present, based on the second correspondence, the plot clip in the audiovisual work that corresponds to the map marker point and the first plot element.

In an optional design of this embodiment, the audiovisual work includes a video, and the first plot element includes a first character; and the presentation module 1460 is configured to: obtain a first correspondence, the first correspondence including a correspondence between the map marker point and the plot clip; determine video clips corresponding to the map marker point based on the first correspondence; identify a video clip corresponding to the first character among the video clips corresponding to the map marker point, the video clip including at least one of a face video frame and a voice audio frame of the first character; and display the video clip.

In an optional design of this embodiment, the audiovisual work includes an audio; and the presentation module 1460 is configured to: obtain a first correspondence, the first correspondence including a correspondence between the map marker point and the plot clip; determine audio clips corresponding to the map marker point based on the first correspondence; identify an audio clip including a keyword of the first plot element among the audio clips corresponding to the map marker point; and play the audio clip.

In an optional design of this embodiment, the audiovisual work includes a literary work; and the presentation module 1460 is configured to: obtain a first correspondence, the first correspondence including a correspondence between the map marker point and the plot clip; determine chapter clips corresponding to the map marker point based on the first correspondence; identify a chapter clip including a keyword of the first plot element among the chapter clips corresponding to the map marker point; and display the chapter clip.

In an optional design of this embodiment, the display module 1420 is configured to: display a fast-forward animation in a case that a plot clip being presented is earlier than the plot clip corresponding to the map marker point; and display a fast-rewind animation in a case that the plot clip being presented is later than the plot clip corresponding to the map marker point.

In an optional design of this embodiment, the display module 1420 is configured to display timeline information on the map control based on each map point, the timeline information being used for indicating a time sequence in which each map point appears in the plot.

In an optional design of this embodiment, the display module 1420 is configured to: display a sequence number on each map point of the map control, and display a connection line between two map points with adjacent sequence numbers, the sequence number being used for representing a time sequence in which the corresponding map point appears in the plot; or display an arrow line between each map point of the map control, the arrow line being used for representing a time sequence in which two adjacent map points appear in the plot.

In an optional design of this embodiment, the display module 1420 is configured to display timeline information of the first plot element on the map control based on each map point, the timeline information being used for indicating a time sequence in which the first plot element appears in each map point.

In an optional design of this embodiment, the display module 1420 is configured to: highlight, on the map control, a map point corresponding to a plot clip being played; or highlight, on the map control, a map point corresponding to a target plot character being played, the highlighting including: at least one of bold display, enlarged display, inverse color display, a foreground color change, a background color change, and addition of an animation special effect.

In an optional design of this embodiment, the display module 1420 is configured to display the map control of the audiovisual work in a case that a first trigger condition is satisfied, the first trigger condition including any one of the following conditions:

a presentation starting operation on the audiovisual work is received;

a drag operation or a jump operation on a playback progress bar of the audiovisual work is received;

the drag operation on the playback progress bar of the audiovisual work is received, and a drag distance of the drag operation is greater than a first threshold;

the jump operation on the playback progress bar of the audiovisual work is received and a quantity of times for performing the jump operation is greater than a second threshold;

a fast-forward operation or a fast-rewind operation on the audiovisual work is received;

an open operation on a directory of the audiovisual work, the jump operation, a forward operation, or a backward operation is received; and playback is performed to a specified progress on the playback progress bar.

In an optional design of this embodiment, the display module 1420 is configured to cancel the display of the map control of the audiovisual work in a case that a second trigger condition is satisfied, the second trigger condition including any one of the following conditions:

a turn-off operation for turning off the map control is received;

no operation has been received on the map control for a duration greater than a third threshold;

the plot clip starts to be played; and a human-machine interaction operation is received on an interaction region other than the map control.

Figure 15:
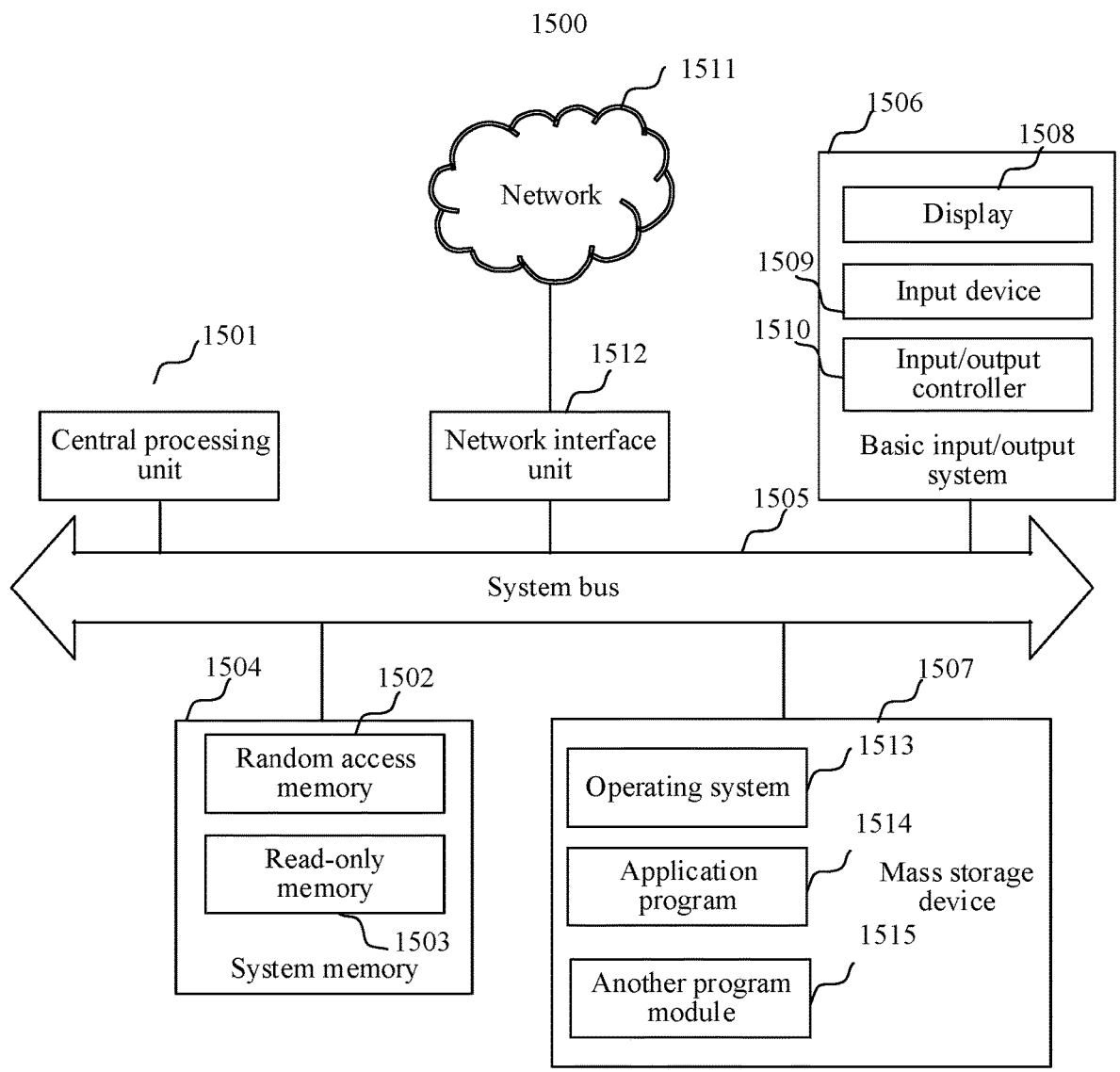
FIG. 15 is a block diagram of a computer device according to an exemplary embodiment.

FIG. 15 is a schematic structural diagram of a computer device according to an exemplary embodiment. The computer device 1500 includes a central processing unit (CPU) 1501, a system memory 1504 including a random access memory (RAM) 1502 and a read-only memory (ROM) 1503, and a system bus 1505 connecting the system memory 1504 to the CPU 1501. The computer device 1500 further includes a basic input/output system (I/O system) 1506 assisting in transmitting information between components in the computer device, and a mass storage device 1507 configured to store an operating system 1513, an application program 1514, and another program module 1515.

The basic I/O system 1506 includes a display 1508 configured to display information, and an input device 1509 such as a mouse and a keyboard for a user to input information. The display 1508 and the input device 1509 are both connected to the CPU 1501 through an input/output controller 1510 connected to the system bus 1505. The basic I/O system 1506 may further include the input/output controller 1510 for receiving and processing input from a plurality of other devices such as a keyboard, a mouse, an electronic stylus, or the like. Similarly, the input/output controller 1510 further provides output to a display screen, a printer, or other types of output devices.

The mass storage device 1507 is connected to the CPU 1501 through a mass storage controller (not shown) connected to the system bus 1505. The mass storage device 1507 and an associated computer device-readable medium provide non-volatile storage for the computer device 1500. That is, the mass storage device 1507 may include a computer device-readable medium (not shown) such as a hard disk or a compact disc read-only memory (CD-ROM) drive.

In general, the computer device-readable medium may include a computer device storage medium and a communication medium. The computer device storage medium includes volatile and non-volatile, removable and non-removable media that are configured to store information such as computer device-readable instructions, data structures, program modules, or other data and that are implemented by using any method or technology. The non-transitory computer device storage medium includes a RAM, a ROM, an erasable programmable read only memory (EPROM), an electrically erasable programmable read only memory (EEPROM), a CD-ROM, a digital video disc (DVD) or another optical memory, a tape cartridge, a magnetic cassette, a magnetic disk memory, or another magnetic storage device. Certainly, a person skilled in the art can learn that the computer device storage medium is not limited to the foregoing several types. The foregoing system memory 1504 and mass storage device 1507 may be collectively referred to as a memory.

According to the embodiments of this application, the computer device 1500 may further be connected, through a network such as the Internet, to a remote computer device on the network. That is, the computer device 1500 may be connected to a network 1511 by using a network interface unit 1512 connected to the system bus 1505, or may be connected to another type of network or a remote computer device system (not shown) by using a network interface unit 1515.

The memory further includes one or more programs. The one or more programs are stored in the memory. The CPU 1501 executes the one or more programs to implement all or some steps of the foregoing method for presenting an audiovisual work.

This application further provides a non-transitory computer-readable storage medium, storing at least one instruction, at least one program, a code set, or an instruction set, the at least one instruction, the at least one program, the code set, or the instruction set being loaded and executed by a processor to implement the method for presenting an audiovisual work according to the foregoing method embodiments.

Optionally, this application further provides a computer program product, including computer instructions, the computer instructions being stored in a non-transitory computer-readable storage medium. A processor of a computer device reads the computer instructions from the non-transitory computer-readable storage medium, and executes the computer instructions to cause the computer device to perform the foregoing method for presenting an audiovisual work provided in the foregoing embodiments.

What is claimed is:

1. A method for presenting an audiovisual work, applicable to a device, the method comprising:

displaying a map control of the audiovisual work, the map control displaying a map associated with a plot of the audiovisual work;

displaying a plot element selection control of the audiovisual work;

selecting a first plot element in the audiovisual work in response to a first selection operation on the plot element selection control, wherein the first plot element is a role that appears in a plot of the audiovisual work and comprises a plot character;

in response to the selecting the first plot element, only displaying candidate map points corresponding to the first plot element on the map control, wherein in the audiovisual work, the first plot element appears in every location represented by the candidate map points;

determining a marker point from the candidate map points in response to a location marking operation on the map;

presenting a plot clip in the audiovisual work that corresponds to the marker point; and highlighting, on the map control, a first map point corresponding to the plot clip being played, the first map point representing a coordinate point on a spatial dimension and indicating where the plot clip is located;

or highlighting, on the map control, a second map point corresponding to a target plot character being played, the second map point representing a coordinate point on the spatial dimension and indicating where the target plot character is located, wherein the highlighting comprises at least one of: a bold display, an enlarged display, an inverse color display, a foreground color change, or a background color change.

2. The method according to claim 1, wherein determining, in response to the drag operation on the location marking control, the location indicated by the drag operation as the marker point comprises:

determining, in response to the drag operation on the location marking control, a candidate map point on the map that is closest to an end location of the drag operation as the marker point.

3. The method according to claim 1, wherein presenting the plot clip in the audiovisual work that corresponds to the marker point comprises:

obtaining a first correspondence, the first correspondence comprising a correspondence between the marker point and the plot clip; and presenting, based on the first correspondence, the plot clip in the audiovisual work that corresponds to the marker point.

4. The method according to claim 1, wherein presenting the plot clip in the audiovisual work that corresponds to the marker point comprises:

presenting the plot clip in the audiovisual work that corresponds to the marker point and the first plot element.

5. The method according to claim 4, further comprising:

selecting a second plot element in response to a second selection operation on the plot element selection control; and switching to a plot clip in the audiovisual work that corresponds to the marker point and the second plot element for presentation.

6. The method according to claim 4, wherein presenting the plot clip in the audiovisual work that corresponds to the marker point and the first plot element comprises:

obtaining a second correspondence, the second correspondence comprising a correspondence among the marker point, the first plot element, and the plot clip; and presenting, based on the second correspondence, the plot clip in the audiovisual work that corresponds to the marker point and the first plot element.

7. The method according to claim 4, wherein the audiovisual work comprises a video, the first plot element comprises a first character; and wherein presenting the plot clip in the audiovisual work that corresponds to the marker point and the first plot element comprises:

obtaining a first correspondence, the first correspondence comprising a correspondence between the marker point and plot clips;

determining, from the video, the plot clips corresponding to the marker point based on the first correspondence;

identifying a video clip corresponding to the first character among the plot clips, the video clip comprising at least one of: a face video frame featuring the first character; or an audio frame featuring the first character; and displaying the video clip.

8. The method according to claim 4, wherein the audiovisual work comprises an audio, and wherein presenting the plot clip in the audiovisual work that corresponds to the marker point and the first plot element comprises:

obtaining a first correspondence, the first correspondence comprising a correspondence between the marker point and plot clips;

determining, from the audio, audio clips corresponding to the marker point based on the first correspondence;

identifying an audio clip comprising a keyword of the first plot element among the audio clips; and playing the audio clip.

9. The method according to claim 4, wherein the audiovisual work comprises a literary work, and wherein presenting a plot clip in the audiovisual work that corresponds to the marker point and the first plot element comprises:

obtaining a first correspondence, the first correspondence comprising a correspondence between the marker point and plot clips;

determining chapter clips corresponding to the marker point based on the first correspondence;

identifying a chapter clip comprising a keyword of the first plot element among the chapter clips; and displaying the chapter clip.

10. The method according to claim 1, further comprising:

displaying a fast-forward animation in response to a current plot clip being presented is earlier than the plot clip corresponding to the marker point; and displaying a fast-rewind animation in response to the current plot clip being presented is later than the plot clip corresponding to the marker point.

11. The method according to claim 1, further comprising:

displaying timeline information on the map control based on each of the candidate map points, the timeline information being used for indicating a time sequence in which the each of the map points appears in the plot.

12. The method according to claim 11, wherein displaying timeline information on the map control based on the each of the candidate map points comprises one of:

displaying a sequence number on the each of the candidate map points; and displaying a connection line between two map points with adjacent sequence numbers, the sequence number being used for representing a time sequence in which the corresponding candidate map point appears in the plot; or displaying an arrow line between the each of the candidate map points, the arrow line being used for representing a time sequence in which two adjacent candidate map points appear in the plot.

13. The method according to claim 1, wherein displaying the map control of the audiovisual work comprises displaying the map control of the audiovisual work in response to a first trigger condition being satisfied, the first trigger condition comprising at least one of following conditions:

a presentation starting operation on the audiovisual work being received;

a drag operation or a jump operation on a playback progress bar of the audiovisual work being received;

a drag operation on the playback progress bar of the audiovisual work being received, and a drag distance of the drag operation being greater than a first threshold;

a jump operation on the playback progress bar of the audiovisual work being received and a quantity of times for performing the jump operation being greater than a second threshold;

a fast-forward operation or a fast-rewind operation on the audiovisual work being received;

for a directory of the audiovisual work: an open operation, a jump operation, a forward operation, or a backward operation being received; or playback of the audiovisual work being performed to a specified progress on the playback progress bar.

14. The method according to claim 1, further comprising:

stop displaying the map control of the audiovisual work in response to a second trigger condition being satisfied, the second trigger condition comprising at least one of following conditions:

a turn-off operation for turning off the map control being received;

no operation being received on the map control for a duration greater than a third threshold;

the plot clip starting to be played; or a human-machine interaction operation being received on an interaction region other than the map control.

15. A device for presenting an audiovisual work, the device comprising a memory for storing computer instructions and a processor in communication with the memory, wherein, when the processor executes the computer instructions, the processor is configured to cause the device to:

display a map control of the audiovisual work, the map control displaying a map associated with a plot of the audiovisual work;

display a plot element selection control of the audiovisual work;

select a first plot element in the audiovisual work in response to a first selection operation on the plot element selection control, wherein the first plot element is a role that appears in a plot of the audiovisual work and comprises a plot character;

in response to the first plot element being selected, only display candidate map points corresponding to the first plot element on the map control, wherein in the audiovisual work, the first plot element appears in every location represented by the candidate map points;

determine a marker point from the candidate map points in response to a location marking operation on the map;

present a plot clip in the audiovisual work that corresponds to the marker point; and highlight, on the map control, a first map point corresponding to the plot clip being played, the first map point representing a coordinate point on a spatial dimension and indicating where the plot clip is located; or highlighting, on the map control, a second map point corresponding to a target plot character being played, the second map point representing a coordinate point on the spatial dimension and indicating where the target plot character is located, wherein a manner for highlighting comprises at least one of: a bold display, an enlarged display, an inverse color display, a foreground color change, or a background color change.

16. The device according to claim 15, wherein, when the processor is configured to cause the device to determine, in response to the drag operation on the location marking control, the location indicated by the drag operation as the marker point, the processor is configured to cause the device to:

determine, in response to the drag operation on the location marking control, a candidate map point on the map that is closest to an end location of the drag operation as the marker point.

17. The device according to claim 15, wherein, when the processor is configured to cause the device to present the plot clip in the audiovisual work that corresponds to the marker point, the processor is configured to cause the device to:

obtain a first correspondence, the first correspondence comprising a correspondence between the marker point and the plot clip; and present, based on the first correspondence, the plot clip in the audiovisual work that corresponds to the marker point.

18. A non-transitory storage medium for storing computer readable instructions, the computer readable instructions, when executed by a processor in a device for presenting an audiovisual work, causing the processor to:

display a map control of the audiovisual work, the map control displaying a map associated with a plot of the audiovisual work;

display a plot element selection control of the audiovisual work;

select a first plot element in the audiovisual work in response to a first selection operation on the plot element selection control, wherein the first plot element is a role that appears in a plot of the audiovisual work and comprises a plot character;

in response to the first plot element being selected, only display candidate map points corresponding to the first plot element on the map control, wherein in the audiovisual work, the first plot element appears in every location represented by the candidate map points;

determine a marker point from the candidate map points in response to a location marking operation on the map;

present a plot clip in the audiovisual work that corresponds to the marker point; and highlight, on the map control, a first map point corresponding to the plot clip being played, the first map point representing a coordinate point on a spatial dimension and indicating where the plot clip is located; or highlighting, on the map control, a second map point corresponding to a target plot character being played, the second map point representing a coordinate point on the spatial dimension and indicating where the target plot character is located, wherein a manner for highlighting comprises at least one of: a bold display, an enlarged display, an inverse color display, a foreground color change, or a background color change.

* * * * *